United States Patent
Nguyen et al.

(10) Patent No.: US 7,702,587 B2
(45) Date of Patent: Apr. 20, 2010

(54) SYSTEM AND METHOD FOR GENERATION OF CUSTOMIZED CARDS HAVING A GIFT VALUE ASSOCIATED THEREWITH

(75) Inventors: Truc Nguyen, San Diego, CA (US);
Mike Yeung, Mission Viejo, CA (US);
John X. Garred, Brecksville, OH (US);
Susan L. Mizer, Twinsburg, OH (US);
Emily Tucker, Los Angeles, CA (US)

(73) Assignees: Kabushiki Kaisha Toshiba (JP);
Toshiba Tec Kabushiki Kaisha (JP)

( * ) Notice: Subject to any disclaimer, the term of this patent is extended or adjusted under 35 U.S.C. 154(b) by 0 days.

(21) Appl. No.: 11/851,987

(22) Filed: Sep. 7, 2007

(65) Prior Publication Data
US 2009/0070258 A1    Mar. 12, 2009

(51) Int. Cl.
*G06Q 40/00* (2006.01)
(52) U.S. Cl. .............. 705/41; 705/39; 705/40
(58) Field of Classification Search .............. 705/39–41
See application file for complete search history.

(56) References Cited

U.S. PATENT DOCUMENTS

| | | | |
|---|---|---|---|
| 5,513,117 A | 4/1996 | Small | |
| 6,598,790 B1* | 7/2003 | Horst | 235/383 |
| 2004/0099730 A1* | 5/2004 | Tuchler et al. | 235/380 |
| 2006/0190332 A1* | 8/2006 | Grider | 705/14 |
| 2006/0259189 A1* | 11/2006 | Perlow et al. | 700/231 |
| 2007/0215699 A1* | 9/2007 | Arego et al. | 235/380 |

OTHER PUBLICATIONS

"Prepaid Gift Card Retail Kiosk" Nov. 11, 2004 @Kiosk Information System, pp. 1-3.*
Erica Sagon, "Buying Gift Cards Gets Even Easier," Nov. 19, 2005, pp. 1-4.*
"A Gift Card Mall in a Kiosk," Apr. 25, 2007, pp. 1-7.*

* cited by examiner

*Primary Examiner*—Hani Kazimi
*Assistant Examiner*—Chia-Yi Liu
(74) *Attorney, Agent, or Firm*—Tucker Ellis & West LLP (57) ABSTRACT

The subject application is directed to a system and method for generating gift cards. Image data representing gift card formats is first generated on an associated display. A gift card is then selected and text data is received representing text associated with the selected gift card. Gift amount data is then received representing a fungible value associated with the selected gift card. Charge data associated with a cost associated with the gift amount is then received. Encoded data, corresponding to the gift amount, is then generated. Thereafter, a tangible gift card is generated in accordance with the selected gift card format and the received text. In accordance with one embodiment of the subject application, the encoded data is stored on a tangible medium on the tangible gift card.

20 Claims, 8 Drawing Sheets

SYSTEM AND METHOD FOR GENERATION OF CUSTOMIZED CARDS HAVING A GIFT VALUE ASSOCIATED THEREWITH

BACKGROUND OF THE INVENTION

The subject application is generally directed to generation of customized cards, and more particularly to customized cards wherein a gift value is associated with the card such that a recipient immediately receives it.

It is customary to give gifts on many occasions, such as birthdays, lifetime milestones, or holidays. Traditionally, gifts are accompanied by a greeting card which is directed to the person and the event. Often, particularly when greeting cards are being sent via the mail or when a particular gift item is not purchased, a card will be given along with a monetary gift, in the form of cash or a check. More recently, many retail establishments will also sell gift cards for set or selected values. Gift cards can be used like money at associated establishments. Gift cards are more limited in scope than cash or checks, but add an element of personalization to a gift.

Early gift cards were in the form of gift certificates for which a value was pre-paid and written on the certificate. An establishment would typically make a record of each certificate and its associated value in the event a certificate was lost, or to prevent counterfeiting or other fraudulent misuse. More recently, gift cards are handled like a credit card, having a similar size and shape. Once procured, a purchaser provides cash or credit information, and a corresponding value is placed on a magnetic strip on the gift card.

Modern day gift cards have advantages to purchasers insofar as they can be obtained in many different values for use in many or varied locations, such as with a pre-paid credit card. Merchants like gift cards insofar as they are relatively immune from fraud and tampering. Their similarity to credit cards allows for existing point-of-sale equipment to handle charges against their value to be made easily. In addition, any lost cards, or unused value results in "slippage" wherein there is pure profit to the issuer. Finally, many gift cards lose all or some value if not redeemed in a set period of time.

Like cash and checks, gift cards, including gift certificates, are typically coupled with a greeting card to commemorate an event associated with the gift. It is still incumbent on a giver to purchase a card, obtain a gift card of a selected amount, and give or mail it to the recipient. While some gift cards may come with holders into which the card may be inserted, these are often non-descript as to an occasion associated with the gift or otherwise relatively austere and impersonal. Whether given with a card or with a holder, there is still time and expense associated with producing a typical gift card, such as one having a magnetic strip, and preparing the card and gift for mailing.

Custom card kiosks are becoming more common. In such systems, a user can go to a screen and select and personalize a greeting card. Once completed to satisfaction, a completed card design is available to be printed. Once printed, it can be signed and mailed or otherwise given to an intended recipient. Conventionally, custom design cards, such as from a kiosk, are used in the same way as off-the-shelf cards.

SUMMARY OF THE INVENTION

In accordance with one embodiment of the subject application, there is provided a system and method for generation of customized cards.

Further, in accordance with one embodiment of the subject application, there is provided a system and method for generation of customized cards wherein a gift value is associated with the card such that a recipient immediately receives it.

Still further, in accordance with one embodiment of the subject application, there is provided a system and method for generation of customized cards having a gift value associated therewith, wherein the generated customized card is able to be redeemed by a recipient using conventional bar code technology.

Still further, in accordance with one embodiment of the subject application, there is provided a system for the generation of gift cards. The system comprises means adapted for generating image data representative of a plurality of gift card formats on an associated display and means adapted for receiving selection data representative of a selected gift card format from the plurality thereof. The system also comprises means adapted for receiving text data representative of text associated with the selected gift card, means adapted for receiving gift amount data representative of a fungible value associated with the selected gift card, and means adapted for receiving charge data associated with a cost associated with the gift amount data. The system further includes means adapted for generating encoded data corresponding to the gift amount data and means adapted for generating tangible gift card in accordance with the selected gift card format and received text, the tangible gift card further including a tangible medium for storing encoded data.

In one embodiment of the subject application, the fungible value is selected from a group comprising cash, credit, coupon, pre-paid debit, voucher, and account debit authorization.

In another embodiment of the subject application, the charge data corresponds to at least one of cash received, credit card charge, debit authorization, and invoice information.

In a further embodiment of the subject application, the tangible medium includes non-volatile data storage. In a preferred embodiment, the non-volatile data storage includes a bar code. In another preferred embodiment, the non-volatile data storage includes an encoded magnetic strip.

In yet another embodiment of the subject application, the system further comprises means adapted for generating at least one of the image data and the text data in accordance with the gift amount data.

Still further, in accordance with one embodiment of the subject application, there is provided a method for generating gift cards in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for generation of customized cards. In particular, the subject application is directed to a system and method for generation of customized cards wherein a gift value is associated with the card such that a recipient immediately receives it. More particularly, the subject application is directed to a system and method for generation of customized cars having a gift value associated therewith, wherein the generated customized card is able to be redeemed by a recipient using conventional bar code, magnetic strip, or smart card technology. It will become apparent to those skilled in the art that the system and method described herein are suitably adapted to a plurality of varying electronic fields employing customized output, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
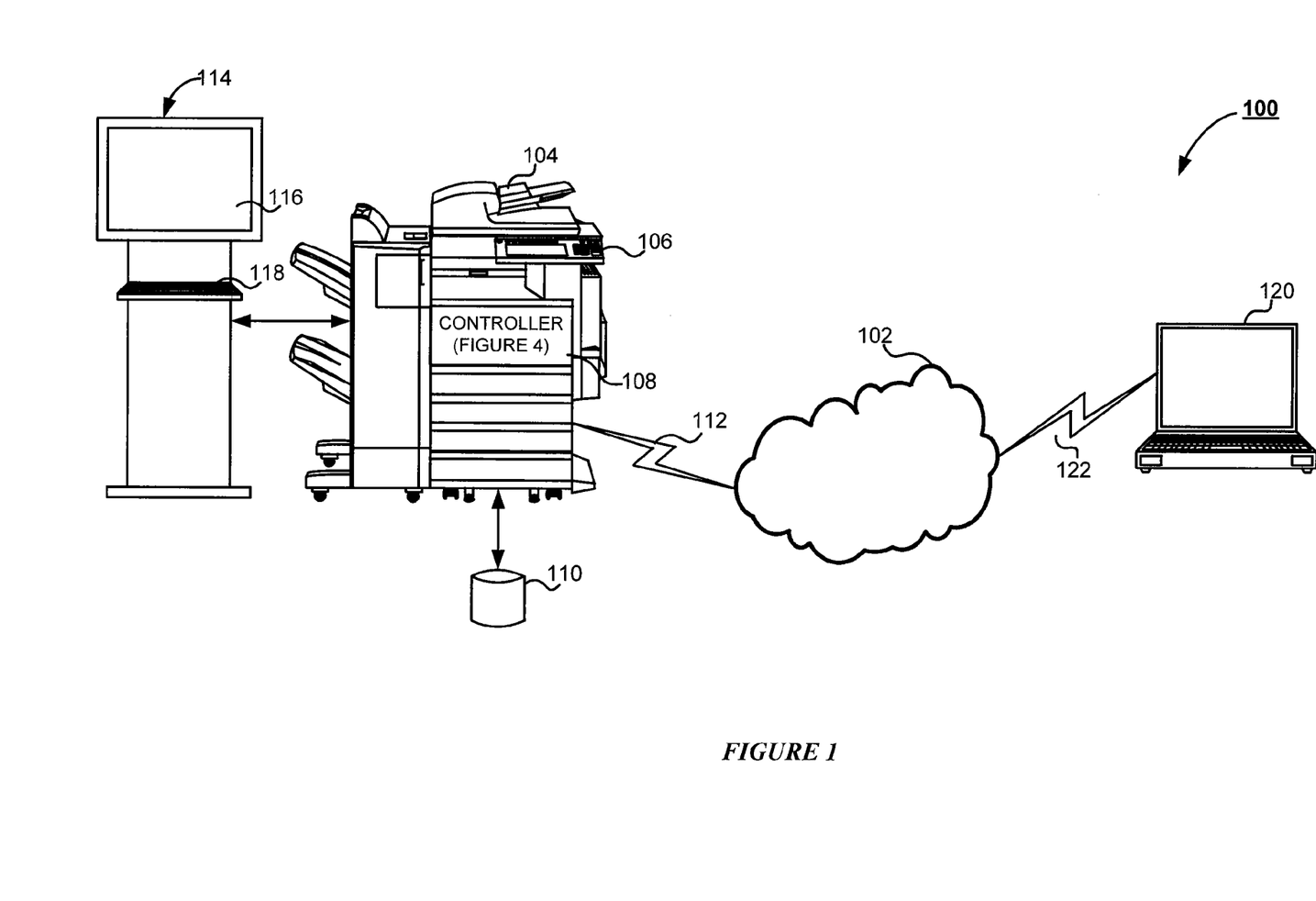
FIG. 1 is an overall diagram of a system for generating gift cards according to one embodiment of the subject application.

Referring now to FIG. 1, there is shown an overall diagram of a system 100 for generation of gift cards in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like. The functioning of the document processing device 104 will better be understood in conjunction with the block diagrams illustrated in FIGS. 2 and 3, explained in greater detail below.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and are intended as such when used hereinafter. Furthermore, the use of the controller 108 hereinafter is for the example embodiment only, and other embodiments, which will be apparent to one skilled in the art, are capable of employing the system and method for generating gift cards of the subject application. The functioning of the controller 108 will better be understood in conjunction with the block diagrams illustrated in FIGS. 4 and 5, explained in greater detail below.

Communicatively coupled to the document processing device 104 is a data storage device 110. In accordance with the preferred embodiment of the subject application, the data storage device 110 is any mass storage devices known in the art including, for example and without limitation, magnetic storage drives, a hard disk drive, optical storage devices, flash memory devices, or any suitable combination thereof. In the preferred embodiment, the data storage device 110 is suitably adapted to store document data, image data, electronic database data, or the like. It will be appreciated by those skilled in the art that while illustrated in FIG. 1 as being a separate component of the system 100, the data storage device 110 is capable of being implemented as an internal storage component of the associated document processing device 104, a component of the controller 108, or the like, such as, for example and without limitation, an internal hard disk drive, or the like. In accordance with one embodiment of the subject application, the data storage device 110 is capable of storing images, gift card formats, fonts, and the like.

Illustrated in FIG. 1 is a kiosk 114, communicatively coupled to the document processing device 104, and in effect, the computer network 102. It will be appreciated by those skilled in the art that the kiosk 114 is capable of being implemented as a separate component of the document processing device 104, or as an integral component thereof. Use of the kiosk 114 in FIG. 1 is for example purposes only, and the skilled artisan will appreciate that the subject application is capable of implementation without the use of kiosk. In accordance with one embodiment of the subject application, the kiosk 114 includes a display 116 and a user input device 118. As will be understood by those skilled in the art the kiosk 114 is capable of implementing a combination user input device/display, such as a touch screen interface. According to one embodiment of the subject application, the kiosk 114 is suitably adapted to display prompts to an associated user, receive instructions from the associated user, receive payment data, receive selection data from the associated user, and the like. Preferably, the kiosk 114 is suitably adapted to receive a portable storage media, such as a magnetic card, which includes transaction identification data. In accordance with such an embodiment, the kiosk 114 includes a magnetic card reader, conventional bar code reader, or the like, suitably adapted to receive and read data from a portable storage device.

The system 100 illustrated in FIG. 1 further depicts a user device 120, in data communication with the computer network 102 via a communications link 122. It will be appreciated by those skilled in the art that the user device 120 is shown in FIG. 1 as a laptop computer for illustration purposes only. As will be understood by those skilled in the art, the user device 120 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 122 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 120 is suitably adapted to generate and transmit electronic documents, document processing instructions, user interface modifications, upgrades, updates, personalization data, or the like, to the document processing device 104, or any other similar device coupled to the computer network 102. In accordance with one embodiment of the subject application, the user device 120 includes a web browser application, suitably adapted to securely interact with the document processing device 104, or the like. The skilled artisan will appreciate that the user device 120 is also capable of implementation as an administrative device, whereupon a user associated with the device 120 is able to access, delete, view, or otherwise modify data stored on the data storage device 110 associated with the document processing device 104.

The system 100 further includes a backend transactional/monitoring server 124 in data communication with the kiosk 114 via the communication link 128 to the computer network 102. As will be appreciated by those skilled in the art, the communication link 128 is any suitable communications channel known in the art including, for example and without limitation, 802.11a, 802.11b, 802.11g, 802.11(x), Bluetooth, WiMax, a proprietary communications network, infrared, optical, the public switched telephone network, or any suitable wireless data transmission system, or wired communications. As shown in FIG. 1, the server 124 includes a data storage device 126, communicatively coupled thereto. It will be understood by those skilled in the art that the data storage device 126 is any mass storage device known in the art including, for example and without limitation, magnetic storage drives, a hard disk drive, optical storage devices, flash memory devices, or any suitable combination thereof. In one embodiment of the subject application, the data storage device 110 is suitably adapted to store customer data, account data, database data, inventory data, or the like. It will be appreciated by those skilled in the art that while illustrated in FIG. 1 as being a separate component of the system 100, the data storage device 126 is capable of being implemented as an internal storage component of the associated server 124, such as, for example and without limitation, an internal hard disk drive, or the like. In accordance with one embodiment of the subject application, the server corresponds to a merchant, bank, restaurant, credit card company, or other party that desires to issue, validate, authorize, or otherwise interact with customized gift cards. Thus, a store associated with a participating merchant, will typically include some server 124 to monitor the amounts on a store-issued debit card, gift card, or the like, such as the customized gift cards of the subject application. The functioning of the server 124 will better be understood in conjunction with the block diagram illustrated in FIG. 6, explained in greater detail below.

Figure 2:
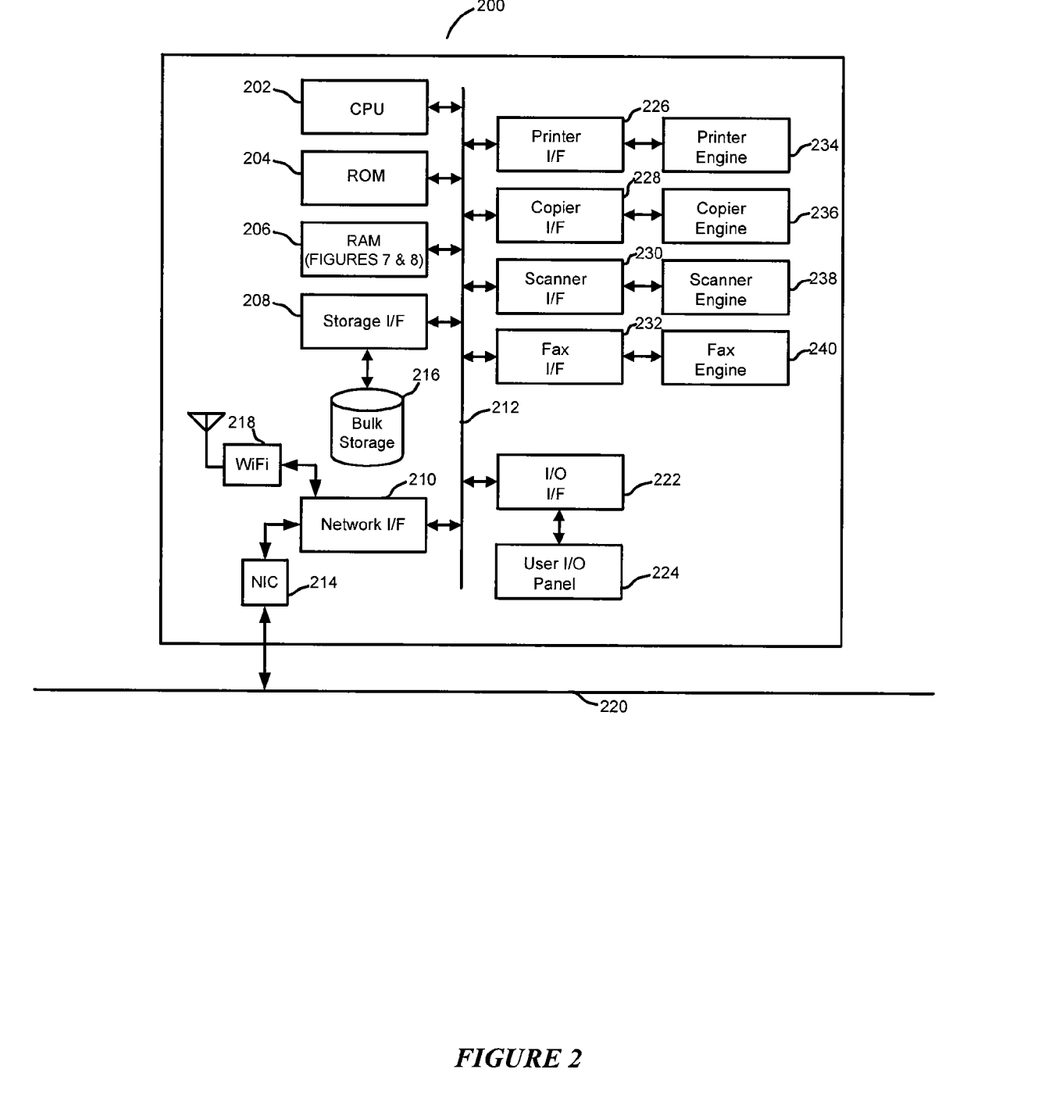
FIG. 2 is a block diagram illustrating device hardware for use in the system for generating gift cards according to one embodiment of the subject application.

Turning now to FIG. 2, illustrated is a representative architecture of a suitable device 200, (shown in FIG. 1 as the document processing device 104), on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
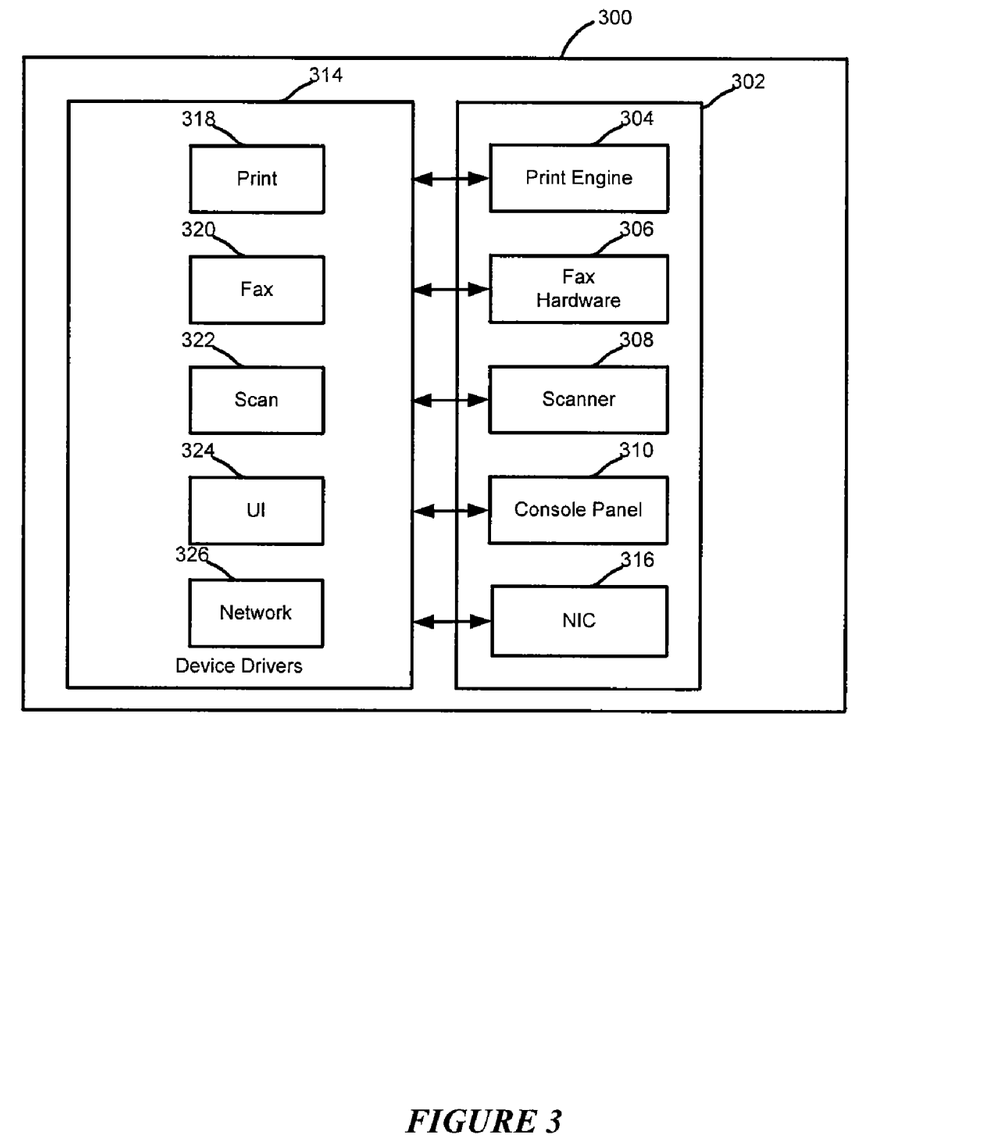
FIG. 3 is a functional diagram illustrating the device for use in the system for generating gift cards according to one embodiment of the subject application.

Turning now to FIG. 3, illustrated is a suitable document processing device, (shown in FIG. 1 as the document processing device 104), for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
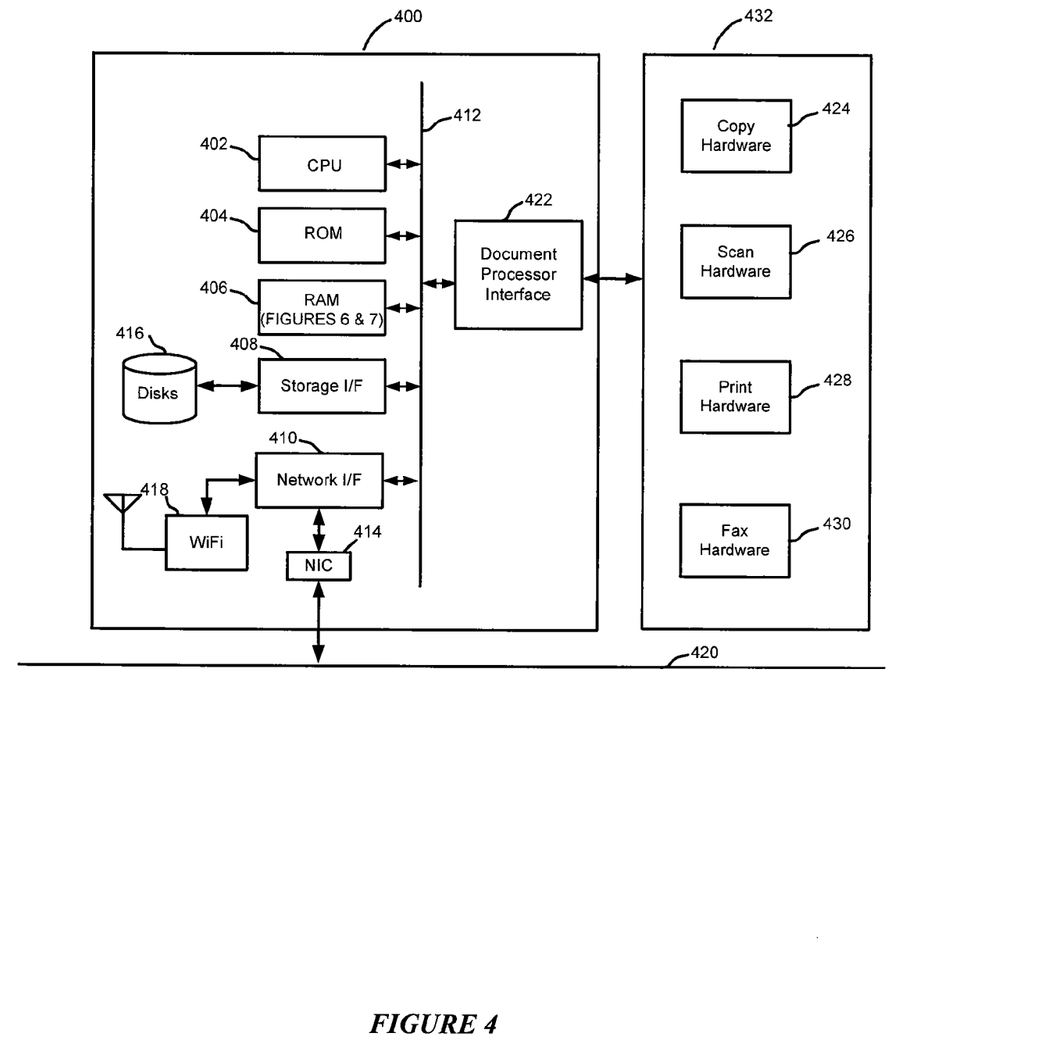
FIG. 4 is a block diagram illustrating controller hardware for use in the system for generating gift cards according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 108 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with bus the 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
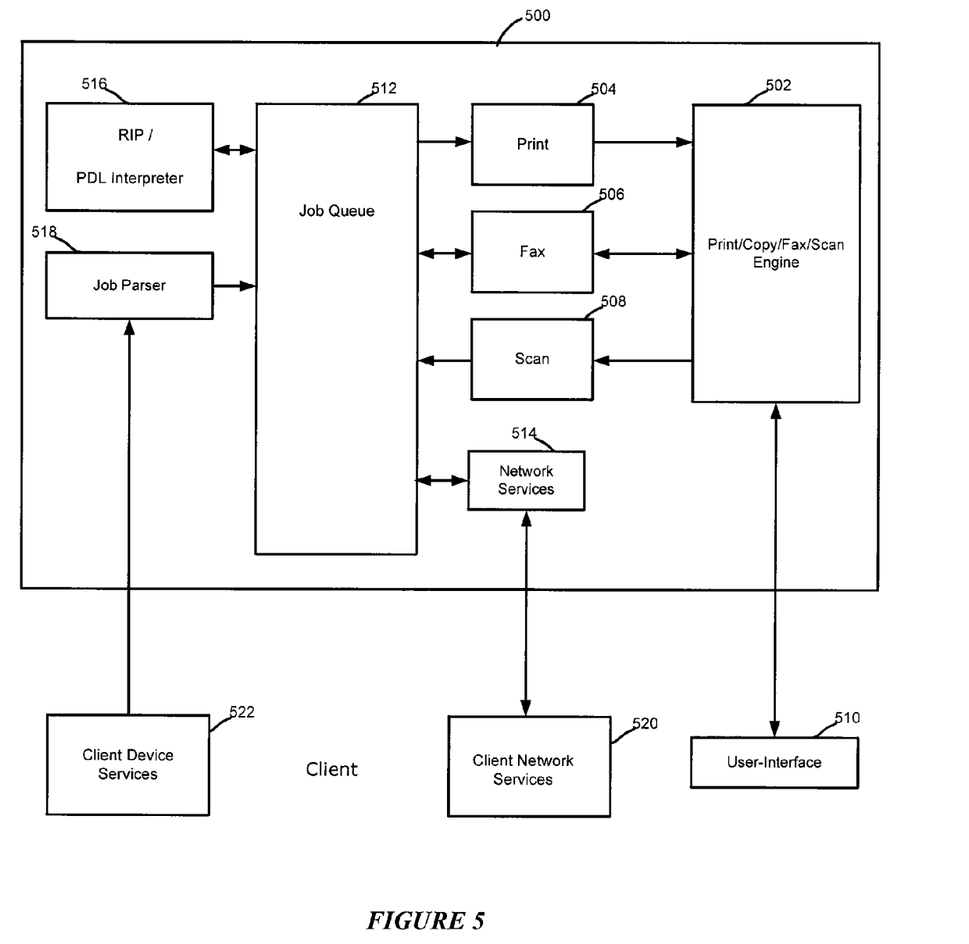
FIG. 5 is a functional diagram illustrating the controller for use in the system for generating gift cards according to one embodiment of the subject application.

Functionality of the subject system 100 is accomplished on a suitable document processing device, such as the document processing device 104, which include the controller 400 of FIG. 4, (shown in FIG. 1 as the controller 108) as an intelligent subsystem associated with a document processing device. In the illustration of FIG. 5, controller function 500 in the preferred embodiment, includes a document processing engine 502. A suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 508 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The Parser 518 functions to interpret a received electronic document file and relay it to the job queue 512 for handling in connection with the afore-described functionality and components.

Figure 6:
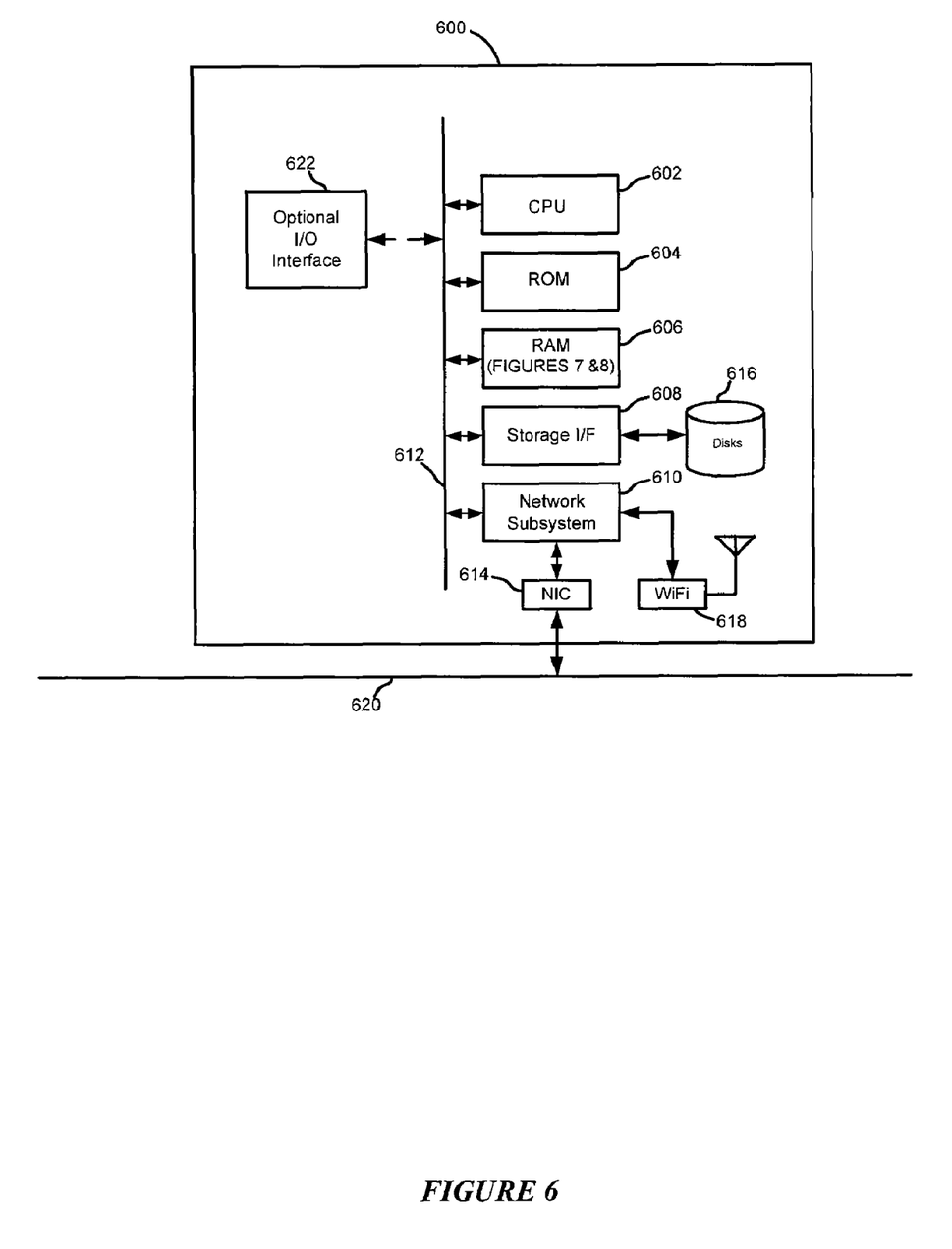
FIG. 6 is a block diagram illustrating server hardware for use in the system for generating gift cards according to one embodiment of the subject application.

Turning now to FIG. 6, illustrated is a representative architecture of a suitable server 600, shown in FIG. 1 as the backend transactional/monitoring server 124, on which operations of the subject system are completed. Included is a processor 602, suitably comprised of a central processor unit. However, it will be appreciated that processor 602 may advantageously be composed of multiple processors working in concert with one another as will be appreciated by one of ordinary skill in the art. Also included is a non-volatile or read only memory 604 which is advantageously used for static or fixed data or instructions, such as BIOS functions, system functions, system configuration, and other routines or data used for operation of the server 600.

Also included in the server 600 is random access memory 606, suitably formed of dynamic random access memory, static random access memory, or any other suitable, addressable memory system. Random access memory provides a storage area for data instructions associated with applications and data handling accomplished by the processor 602.

A storage interface 608 suitably provides a mechanism for volatile, bulk or long term storage of data associated with the server 600. The storage interface 608 suitably uses bulk storage, such as any suitable addressable or serial storage, such as a disk, optical, tape drive and the like as shown as 616, as well as any suitable storage medium as will be appreciated by one of ordinary skill in the art.

A network interface subsystem 610 suitably routes input and output from an associated network allowing the server 600 to communicate to other devices. The network interface subsystem 610 suitably interfaces with one or more connections with external devices to the server 600. By way of example, illustrated is at least one network interface card 614 for data communication with fixed or wired networks, such as Ethernet, token ring, and the like, and a wireless interface 618, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 614 is interconnected for data interchange via a physical network 620, suitably comprised of a local area network, wide area network, or a combination thereof.

Data communication between the processor 602, read only memory 604, random access memory 606, storage interface 608 and the network subsystem 610 is suitably accomplished via a bus data transfer mechanism, such as illustrated by bus 612.

Suitable executable instructions on the server 600 facilitate communication with a plurality of external devices, such as workstations, document processing devices, other servers, or the like. While, in operation, a typical server operates autonomously, it is to be appreciated that direct control by a local user is sometimes desirable, and is suitably accomplished via an optional input/output interface 622 as will be appreciated by one of ordinary skill in the art.

In operation, image data representing a plurality of gift card formats is first generated on an associated display. Selection data is then received representing a selected gift card format. Text data is then received representing text associated with the selected gift card. Gift amount data is then received representing a fungible value associated with the selected gift card. Charge data associated with a cost associated with the gift amount is then received. Encoded data, corresponding to the gift amount, is then generated. Thereafter, a tangible gift card is generated in accordance with the selected gift card format and the received text. In accordance with one embodiment of the subject application, the encoded data is stored on a tangible medium on the tangible gift card.

In accordance with one example embodiment of the subject application, a gift card request is received from an associated user via the user interface 106 of the document processing device 104, the self-service kiosk 114 communicatively coupled to the document processing device 104, the user device 120 via a suitable thin client, or the like. Preferably, the request corresponds to a request for a tangible output of a gift card by the document processing device 104. The available gift card formats are then retrieved from the data storage device 110 and images of the retrieved formats are displayed to the user via the user interface 106, the display 116, the user device 120, or the like. In accordance with one embodiment of the subject application, images representing the available gift card formats illustrate the available themes, fonts, styles, merchants, restaurants, online-vendors, credit card issuers, e.g., AMERICAN EXPRESS, VISA, MASTERCARD, and the like, associated with each format, e.g., one format corresponds to a birthday theme, another format corresponds to a graduation theme, and the like.

The user is then prompted to select a desired gift card format and a determination is then made whether the user desires to add a photograph or additional image to the gift card. When the user does not require the addition of an image, a determination is made whether the user desires to add text to the gift card. That is, the user is capable of selecting a stock greeting, a personalized greeting, or the like, for incorporation onto the gift card. When the user desires to add text to the gift card, the user is prompted to select text associated with the gift card. Following completion of adding text to the gift card, or when no text is desired, the user is prompted to select a fungible value associated with the gift card. That is, the user is prompted to select an amount of the gift to be credited to the gift card. Suitable examples of such a fungible value includes, for example and without limitation, cash, credit, coupon, pre-paid debit, voucher, account debit authorization, or the like. The controller 108 or other suitable component associated with the document processing device 104, the kiosk 114, or the combination thereof, then calculates the total costs associated with the production of the customized gift card. It will be appreciated by those skilled in the art that the total cost associated with the gift card is capable of including, for example and without limitation, toner costs, media costs, taxes, issuer fees, the gift value, and the like.

The total calculated costs are then displayed to the user via the user interface 106, the display 116, the thin client of the user device 120, or the like, for user acceptance. When the total costs have been accepted by the user, the user is prompted to provide payment for the gift card. In accordance with one embodiment of the subject application, the kiosk 114 includes a magnetic card reader for acceptance of credit card payment, a bill receiver for the acceptance of cash, or the like. The payment data received from the user and/or all other associated data relating to the customized gift card is then communicated to the backend transactional server 124 associated with the party issuing the gift card, e.g., the bank, merchant, restaurant, credit card issuer, or the like. Preferably, the server 124 stores the gift card information in an associated account database, e.g., the data storage device 126. In accordance with one embodiment, the server 124 returns suitable authentication data to the kiosk 114 corresponding to authorization and/or activation of the gift card incorporated into customized gift card. Encoded data corresponding to the selected gift amount is then generated. Suitable forms of payment include, for example and without limitation, cash received, credit card charger, debit authorization, invoice information, or the like. Thereafter, the document processing device 104 outputs a tangible gift card with the encoded data stored thereon in a non-volatile medium. That is, the document processing device 104 outputs a gift card having a magnetic strip containing the encoded value data, a bar code, a programmed memory component, or the like. It will be appreciated by those skilled in the art that the tangible gift card is thus capable of being redeemed via conventional bar code technology, magnetic card reading technology, or the like.

When the user does desire to add a photograph or other personalized image to the gift card, a determination is made whether the image to be added to the gift card is a personal image or a stock image, i.e., an image resident on the data storage device 110 available for inclusion in a personalized gift card output operation. When a stock image is to be used, the available images or photographs are retrieved from the data storage device 110 and displayed to the user via the user interface 106, the display 116, the thin client of the user device 120, or the like. The user then selects the desired image and a determination is made whether the user desires to add text to the gift card. That is, the user is capable of selecting a stock greeting, a personalized greeting, or the like, for incorporation onto the gift card. When the user desires to add text to the gift card, the user is prompted to select text associated with the gift card. Following completion of adding text to the gift card, or when no text is desired, the user is prompted to select a fungible value associated with the gift card. Operations continue thereafter as set forth in greater detail above.

When the image or photograph to be added to the gift card is a personal image, the user is prompted for the image storage location. It will be appreciated by those skilled in the art that the image is capable of being stored on a portable storage medium, on a network storage device, on the hard disk driver of the user device 120, or the like. Personal images located at the designated storage location are then retrieved by the controller 108 or other suitable component of the document processing device 104 or kiosk 114 and displayed to the user for selection via the corresponding displays 106 and 116. User selection of an image is then received and a determination is made whether the user desires to add text to the gift card. That is, the user is capable of selecting a stock greeting, a personalized greeting, or the like, for incorporation onto the gift card. When the user desires to add text to the gift card, the user is prompted to select text associated with the gift card. Following completion of adding text to the gift card, or when no text is desired, the user is prompted to select a fungible value associated with the gift card. In accordance with one particular embodiment of the subject application, the gift amount is used to generate an image on the gift card or text on the gift card, e.g., a graphical or textual representation of the amount of the gift card, as will be appreciated by those skilled in the art. As set forth in greater detail above, a tangible gift card is then output inclusive of the selected gift value, the personal image and the selected text by the document processing device 104. It will be appreciated by those skilled in the art that the gift card output by the document processing device 104 is capable of being read via conventional technologies, such as, for example and without limitation, a conventional magnetic card reader, a conventional bar code scanner, or the like.

Figure 7:
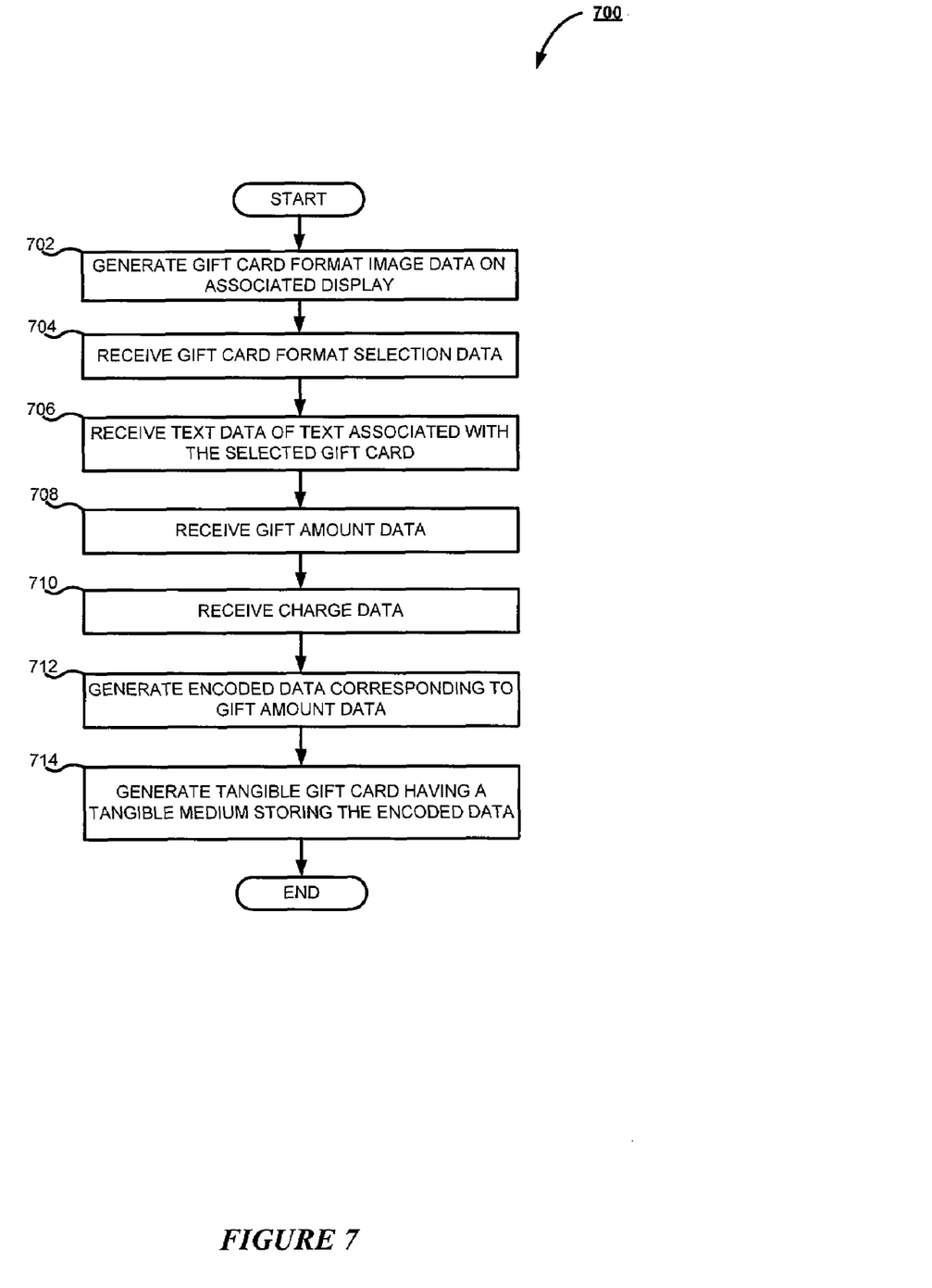
FIG. 7 is a flowchart illustrating a method for generating gift cards according to one embodiment of the subject application.

The skilled artisan will appreciate that the subject system 100 and components described above with respect to FIG. 1, FIG. 2, FIG. 3, FIG. 4, FIG. 5, and FIG. 6, will be better understood in conjunction with the methodologies described hereinafter with respect to FIG. 7 and FIG. 8. Turning now to FIG. 7, there is shown a flowchart 700 illustrating a method for generating gift cards in accordance with one embodiment of the subject application. Beginning at step 702, a plurality of gift card format images are generated on an associated display. It will be appreciated by those skilled in the art that the gift card format images are capable of being generated via the user interface 106 associated with the document processing device 104, the display 116 associated with the self-service kiosk 114, via a thin client resident on the user device 120, e.g., a suitable web browser, or the like. Selection data is then received at step 704 from an associated user corresponding to a selected one of the available gift card formats. As will be appreciated by those skilled in the art, the selection data is capable of being received via the user interface 106, the kiosk 114, the user device 120, or the like. In accordance with one embodiment of the subject application, the selection data is received by the controller 108, or other suitable component of the kiosk 114/document processing device 104 combination, as will be appreciated by those skilled in the art.

Text data is then received corresponding to text associated with the selected gift card format at step 706. As will be understood by those skilled in the art, suitable text data includes, for example and without limitation, a personalized greeting, a value associated with the card, or any other alphanumeric sequence of characters for placement on the selected gift card format. At step 708, gift amount data is received from the associated user corresponding to a fungible value associated with the selected gift card format. In accordance with one embodiment of the subject application, the fungible value includes, for example and without limitation, cash, credit, coupon, pre-paid debit, voucher, account debit authorization, or the like.

At step 710, charge data associated with a cost associated with the gift amount data is received from the associated user. It will be appreciated by those skilled in the art that suitable charge data includes, for example and without limitation, cash received, credit card charge, debit authorization, invoice information, and the like. Thus, as will be apparent to those skilled in the art, the associated user is prompted to provide payment for the selected gift card and the associated selected gift amount. Encoded data is then generated at step 712 corresponding to the selected gift amount. It will be appreciated by those skilled in the art that suitable encoded data includes, for example and without limitation, encrypted magnetically stored data, bar code data, or the like. At step 714, a tangible gift card is generated by the document processing device 104 in accordance with the selected gift card format and the received text. Preferably, the tangible gift card includes the encoded data stored on a tangible medium on the tangible gift card. That is, the encoded data is stored on a magnetic strip on the gift card, a printed bar code on the gift card, a non-volatile storage device embedded or located on the gift card, or the like. In accordance with one embodiment of the subject application, the encoded data is thereby capable of retrieval via conventional bar code reading technology, conventional magnetic card reading technology, or the like, as are known in the art.

Figure 8:
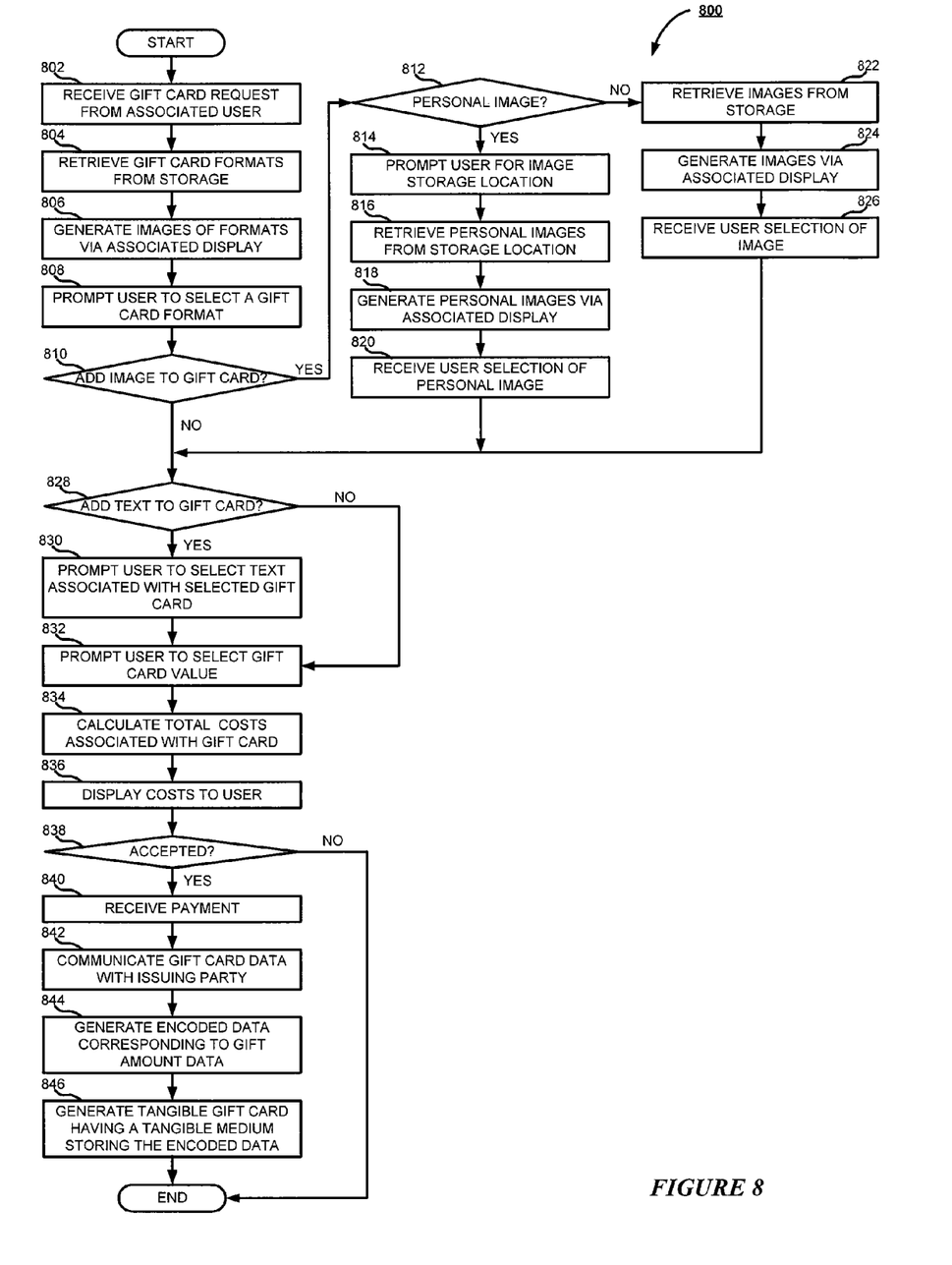
FIG. 8 is a flowchart illustrating a method for generating gift cards according to one embodiment of the subject application.

Referring now to FIG. 8, there is shown a flowchart 800 illustrating a method for generating gift cards in accordance with one embodiment of the subject application. The example embodiment depicted in FIG. 8 begins at step 802, whereupon a gift card request is received from an associated user via the user interface 106 of the document processing device 104, the self-service kiosk 114 communicatively coupled to the document processing device 104, the user device 120 via a suitable thin client, or the like. It will be understood by those skilled in the art that the gift card request suitably corresponds to a request from a user to output a tangible gift card by the document processing device 104. At step 804, the available gift card formats are retrieved from the data storage device 110 by the controller 108 associated with the document processing device 104. In accordance with one embodiment of the subject application, images representing the available gift card formats illustrate the available themes, fonts, styles, merchants, credit card issuers, e.g., AMERICAN EXPRESS, VISA, MASTERCARD, and the like, associated with each format, e.g., one format corresponds to a birthday theme, another format corresponds to a graduation theme, an additional format corresponds to a holiday theme, and the like.

Images of the retrieved gift card formats are then generated, at step 806, and displayed to the associated user via a corresponding display, e.g., the user interface 106, the display 116, the thin client on the user device 120, or the like. At step 808, the user is prompted, via the associated display 106, 116, or 120, to select a gift card format for further operations.

Preferably, the user is prompted via a suitable graphical user interface displaying the available gift card formats.

A determination is then made at step 810 whether an image is to be added to the gift card. When it is determined at step 810 that the user elects to add an image to the gift card, flow proceeds to step 812, whereupon a determination is made whether the image to be added is a personal image. When it is determined that the image to be added is a personal image, the user is prompted, at step 814, to designate the storage location for the personal image. It will be understood by those skilled in the art that the personal image is capable of being located on a portable storage medium, on a network storage device, on the hard disk driver of the user device 120, or the like. At step 816, the personal images stored in the designated storage location are retrieved by the controller 108 or other suitable component of the document processing device 104 or kiosk 114. Personal images are then generated via a suitable display 106, 116, or 120, at step 818, from the personal images stored at the storage location for user selection. User selection of an image is then received at step 820. Flow then proceeds to step 828, which is explained in greater detail below.

At step 812, when it is determined that the image to be added to the gift card is not a personal image, flow proceeds to step 822, whereupon images are retrieved from the data storage device 110, or other known location to the document processing device 104. Images retrieved from the data storage device 110 are then generated at step 824 via the user interface 106, the display 116, the thin client of the user device 120, or the like. Selection of an image is then received from the user at step 826 corresponding to a stock image to be incorporated into the gift card output by the document processing device 104. Flow then progresses to step 828, addressed in greater detail below.

When it is determined at step 810 that no image is to be added to the selected gift card format, or following completion of steps 820 or 826, flow proceeds to step 828, whereupon a determination is made whether text is to be added to the gift card. That is, the user is capable of selecting a stock greeting, a personalized greeting, or the like, for incorporation onto the gift card. When the user desires to add text to the gift card, flow proceeds to step 830, whereupon the user is prompted to select text associated with the gift card. Following completion of adding text to the gift card, or when no text is desired, operations progress to step 832, with the user being prompted to select a fungible value associated with the gift card. Suitable examples of such a fungible value includes, for example and without limitation, cash, credit, coupon, prepaid debit, voucher, account debit authorization, or the like. In accordance with one particular embodiment of the subject application, the gift amount is used to generate an image on the gift card or text on the gift card, e.g., a graphical or textual representation of the amount of the gift card, as will be appreciated by those skilled in the art.

The controller 108 or other suitable component associated with the document processing device 104, the kiosk 114, or the combination thereof, then calculates, at step 834, the total costs associated with the production of the customized gift card. It will be appreciated by those skilled in the art that the total cost associated with the gift card is capable of including, for example and without limitation, toner costs, media costs, taxes, issuer fees, resource usage costs, the gift value, and the like.

The total calculated costs are then displayed to the user at step 836 via the user interface 106, the display 116, the thin client of the user device 120, or the like, for user acceptance. A determination is then made at step 838 whether the costs have been accepted by the user. When the costs are not accepted, the operation terminates without the output of a tangible gift card. When the total costs have been accepted by the user at step 838, the user is prompted to provide payment for the gift card. In accordance with one embodiment of the subject application, the kiosk 114 includes a magnetic card reader for acceptance of credit card payment, a bill receiver for the acceptance of cash, or the like. The payment covering the charges associated with outputting the gift card at the selected value is then received from the user at step 840. As will be appreciated by those skilled in the art, suitable forms of payment include, for example and without limitation, cash received, credit card charger, debit authorization, invoice information, or the like.

The controller 108 or other suitable component associated with the document processing device 104, the kiosk 114, or the combination thereof, then communicates, at step 842, with the backend transactional server 124 associated with the merchant, credit card company, bank, restaurant, or other party issuing and/or honoring the gift card. That is, the server 124 associated with the party sponsoring or issuing the gift card, receives the information corresponding to the amount to be associated with the gift card and the like. It will be appreciated by those skilled in the art that the server 124 is capable of thereafter responding back to the kiosk 114, the controller 108 or other suitable component associated with the document processing device 104 inclusive of, for example and without limitation, authorization data, account information data, and the like.

Encoded data corresponding to the selected gift amount is then generated by the controller 108 at step 844. The skilled artisan will appreciate that the encoded data is capable of including, for example and without limitation, authorization data, gift amount data, account data, and the like. Thereafter, at step 846, the document processing device 104 outputs a tangible gift card with the encoded data stored thereon in a tangible medium. In accordance with one embodiment of the subject application, the tangible medium is a non-volatile medium on the gift card containing, for example and without limitation, machine-readable encoded data representing the selected gift amount. That is, the document processing device 104 outputs a gift card having a magnetic strip containing the encoded value data, a bar code, a programmed memory component, or the like. It will be appreciated by those skilled in the art that the tangible gift card generated in accordance with the system and method described herein is capable of being used in accordance with conventional magnetic card reading technology, conventional bar code reading technology, or other conventional means of retrieving the encoded data from the non-volatile medium of the gift card.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed is:

1. A system for generating a greeting card and associating a gift value with the greeting card, the system comprising:
    means configured for generating image data representative of a plurality of card formats on an associated display;
    means configured for receiving selection data representative of a selected card format from the plurality of card formats;
    data storage configured for storing theme data corresponding to each of a plurality of preselected gift giving themes, including holiday theme data and birthday theme data;
    means configured for generating theme image data representative of each of the plurality of preselected gift giving themes;
    means configured for acquiring theme selection data corresponding to a selection of one of the plurality of gift giving themes;
    means configured for receiving preselected text data representative of text corresponding to the selected card format;
    means configured for receiving image data corresponding to at least one selected image;
    means configured for calculating via processor a tangible output cost of the greeting card in accordance with media cost and toner cost which correspond with the theme selection data, the text data, and the image data;
    means configured for receiving customized text data from an associated user;
    means configured for receiving gift amount data representative of a cash value to be encoded on the greeting card;
    means configured for calculating via processor a content cost of the greeting card in accordance with the theme selection data, the text data and the image data;
    means configured for calculating via processor charge data as a sum of the cash value encoded on the greeting card, the tangible output cost of the greeting card, and the calculated content cost of the greeting card;
    means configured for generating a display reflecting the sum;
    means configured for receiving affirmative approval data corresponding to acceptability of the sum by an associated user;
    means configured for precluding generation of a tangible greeting card in accordance with receipt of negative approval data indicative of non-acceptance of the sum by the associated user;
    means configured for receiving payment reflective of the sum in accordance with the receipt of the affirmative approval data indicative of acceptance of the sum;
    means configured for storing the gift amount data representative of the cash value on a storage of the tangible greeting card in accordance with the receipt of the affirmative approval data; and
    means configured for generating, in accordance with the receipt of the affirmative approval data, the tangible greeting card in accordance with the selected gift card format, the selected gift giving theme, the received preselected text data, and the received customized text.

2. The system of claim 1 wherein the cash value is selected from a group comprising cash, credit, coupon, pre-paid debit, voucher, and account debit authorization.

3. The system of claim 1 wherein the charge data corresponds to at least one of cash received, credit card charge, debit authorization, and invoice information.

4. The system of claim 1 wherein the means configured for storing the gift card amount data on the tangible greeting card includes means for storing the gift card amount data in a non-volatile data storage of the tangible greeting card.

5. The system of claim 4 wherein the means configured for storing the gift card amount data in the non-volatile data storage includes means for storing the gift card amount data as a bar code on the tangible greeting card.

6. The system of claim 4 wherein the means configured for storing the gift card amount data in the non-volatile data storage includes means for encoding the gift card amount data in a magnetic strip of the tangible greeting card.

7. The system of claim 1 further comprising means configured for generating at least one of the image data and the text data in accordance with the gift amount data.

8. A method for generating a greeting card having an associated gift value, the method comprising the steps of:
    generating image data representative of a plurality of card formats on an associated display;
    receiving selection data representative of a selected card format from the plurality of card formats;
    storing theme data corresponding to each of a plurality of preselected gift giving themes, including holiday theme data corresponding to a holiday theme and birthday theme data corresponding to a birthday theme;
    generating theme image data representative of each of the plurality of preselected gift giving themes;
    acquiring theme selection data corresponding to a selection of one of the plurality of gift giving themes;
    receiving preselected text data representative of text corresponding to the selected card format;
    receiving image data corresponding to at least one selected image;
    calculating, via a processor, a tangible output cost of the greeting card in accordance with media cost and toner cost which correspond with the theme selection data, the text data, and the image data;
    receiving customized text data from an associated user;
    receiving gift amount data representative of a cash value to be encoded on the greeting card;
    calculating, via the processor, a content cost of the greeting card in accordance with the theme selection data, the text data, and the image data;
    calculating, via the processor, charge data as a sum of the cash value to be stored on the greeting card, the tangible output cost of the greeting card, and the calculated content cost of the greeting card;
    generating a display reflecting the sum;
    receiving affirmative approval data corresponding to acceptability of the sum by an associated user;

precluding generation of a tangible greeting card in accordance with receipt of negative approval data indicative of non-acceptance of the sum by the associated user;

receiving payment reflective of the sum in accordance with the receipt of the affirmative approval data indicative of acceptance of the sum;

storing the gift amount data representative of the cash value on a storage of the tangible greeting card in accordance with the receipt of the affirmative approval data; and generating, in accordance with the receipt of the affirmative approval data, the tangible greeting card in accordance with the selected gift card format, the selected gift giving theme, the received preselected text data, and the received customized text.

9. The method of claim 8 wherein the cash value is selected from a group comprising cash, credit, coupon, pre-paid debit, voucher, and account debit authorization.

10. The method of claim 8 wherein the calculating the charge data includes calculating the charge data that corresponds to at least one of cash received, credit card charge, debit authorization, and invoice information.

11. The method of claim 8 wherein the storing the gift amount data includes storing the gift amount data in a data storage including a non-volatile data storage.

12. The method of claim 11 wherein the storing the gift amount data includes storing the gift amount data as a bar code.

13. The method of claim 11 wherein the storing the gift amount data includes encoding the gift amount in a magnetic strip.

14. The method of claim 8 further comprising generating at least one of the image data and the text data in accordance with the gift amount data.

15. A computer-implemented method for generating a greeting card having an associated gift value, the computer implemented method comprising:

generating image data representative of a plurality of card formats on an associated display;

receiving selection data representative of a selected card format from the plurality of card formats;

storing theme data corresponding to each of a plurality of preselected gift giving themes, including holiday theme data corresponding to a holiday theme and birthday theme data corresponding to a birthday theme;

generating theme image data representative of each of the plurality of preselected gift giving themes;

acquiring theme selection data corresponding to a selection of one of the plurality of gift giving themes;

receiving preselected text data representative of text corresponding to the selected card format;

receiving image data corresponding to at least one selected image;

calculating, via a processor, a tangible output cost of the greeting card in accordance with media cost and toner cost which correspond with the theme selection data, the text data, and the image data;

receiving customized text data from an associated user;

receiving gift amount data representative of a cash value to be encoded on the greeting card;

calculating, via the processor, a content cost of the greeting card in accordance with the theme selection data, the text data, and the image data;

calculating, via the processor, charge data as a sum of the cash value encoded on the greeting card, the tangible output cost of the greeting card, and the calculated content cost of the greeting card;

generating a display reflecting the sum;

receiving affirmative approval data corresponding to acceptability of the sum by an associated user;

precluding generation of a tangible greeting card in accordance with receipt of negative approval data indicative of non-acceptance of the sum by the associated user;

receiving payment reflective of the sum in accordance with the receipt of the affirmative approval data indicative of acceptance of the sum;

storing the gift amount data representative of the cash value on a storage of the tangible greeting card in accordance with the receipt of the affirmative approval data; and generating, in accordance with the receipt of the affirmative approval data, the tangible greeting card in accordance with the selected gift card format, the selected gift giving theme, the received preselected text data, and the received customized text.

16. The computer-implemented method of claim 15 including selecting the cash value from a group comprising cash, credit, coupon, pre-paid debit, voucher, and account debit authorization.

17. The computer-implemented method of claim 15 wherein the calculating the charge data includes calculating the charge data corresponding to at least one of cash received, credit card charge, debit authorization, and invoice information.

18. The computer-implemented method of claim 15 wherein the storing includes storing the gift amount data in a non-volatile data storage of the tangible greeting card.

19. The computer-implemented method of claim 18 wherein the storing the gift amount data in the non-volatile data storage of the tangible greeting card includes storing the gift amount data in at least one of a bar code of the tangible greeting card and an encoded magnetic strip of the tangible greeting card.

20. The computer-implemented method of claim 15 further comprising generating at least one of the image data and the text data in accordance with the gift amount data.

* * * * *